United States Patent
Rhee et al.

(10) Patent No.: US 11,212,086 B2
(45) Date of Patent: Dec. 28, 2021

(54) CONTINUOUS VARIABLE QUANTUM KEY DISTRIBUTION PHASE COMPENSATION SYSTEM

(71) Applicant: Korea Advanced Institute of Science and Technology, Daejeon (KR)

(72) Inventors: June Koo Rhee, Daejeon (KR); Ii Hwan Park, Daejeon (KR); Kyong Chun Lim, Daejeon (KR); Jun Sang Oh, Daejeon (KR); Yong Seen Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 261 days.

(21) Appl. No.: 16/614,404

(22) PCT Filed: Apr. 13, 2018

(86) PCT No.: PCT/KR2018/004333
§ 371 (c)(1),
(2) Date: Jun. 15, 2020

(87) PCT Pub. No.: WO2018/212461
PCT Pub. Date: Nov. 22, 2018

(65) Prior Publication Data
US 2020/0304300 A1 Sep. 24, 2020

(30) Foreign Application Priority Data

May 19, 2017 (KR) .......................... 10-2017-0062547
Aug. 17, 2017 (KR) .......................... 10-2017-0104075

(51) Int. Cl.
*H04B 10/00* (2013.01)
*H04L 9/08* (2006.01)
(Continued)

(52) U.S. Cl.
CPC ........... *H04L 9/0858* (2013.01); *H04B 10/63* (2013.01); *H04B 10/70* (2013.01); *H04L 9/0825* (2013.01); *H04L 9/0827* (2013.01)

(58) Field of Classification Search
CPC ....... H04B 10/615; H04B 10/63; H04B 10/70
See application file for complete search history.

(56) References Cited

U.S. PATENT DOCUMENTS 8,600,051 B2  12/2013  Noh
9,310,469 B2  4/2016  Ohnishi
(Continued)

FOREIGN PATENT DOCUMENTS

CN  104301101 A  1/2015
JP  2011188073 A  9/2011
(Continued)

OTHER PUBLICATIONS

Leverrier et al., "Multidimensional reconciliation for a continuous-variable quantum key distribution", Physical Review A, 8 pages, 2008, vol. 77, Issue 4.

Primary Examiner — Daniel G Dobson
(74) Attorney, Agent, or Firm — The Webb Law Firm (57) ABSTRACT

The present invention, which is used for continuous variable quantum key distribution (CVQKD) with asynchronous local oscillators, relates to a system for performing a phase compensation of a scheme of using LO phase estimation and feedback at a receiver (Bob) using a pilot signal from a transmitter (Alice) and a scheme of measuring quantum state data using an LO having a predetermined phase at the receiver (Bob) and estimating and feeding back an LO phase through multi-dimensional reconciliation (MDR).

8 Claims, 8 Drawing Sheets

(51) Int. Cl.
    *H04B 10/63*     (2013.01)
    *H04B 10/70*     (2013.01)
    *H04J 14/00*     (2006.01)

(56) References Cited

U.S. PATENT DOCUMENTS

2009/0080906 A1*   3/2009   Tao ................ H04B 10/613
                                                                                         398/209
2018/0367301 A1*  12/2018   Su ..................... H04L 9/0852

FOREIGN PATENT DOCUMENTS

| JP | 5377934 B2 | 12/2013 |
|---|---|---|
| JP | 6071332 B2 | 2/2017 |
| KR | 1020090124679 A | 12/2009 |
| KR | 1020160070032 A | 6/2016 |
| WO | 2016093610 A1 | 6/2016 |

* cited by examiner

CONTINUOUS VARIABLE QUANTUM KEY DISTRIBUTION PHASE COMPENSATION SYSTEM

CROSS-REFERENCE TO RELATED APPLICATIONS

This application is the United States national phase of International Application No. PCT/KR2018/004333 filed Apr. 13, 2018, and claims priority to Korean Patent Application Nos. 10-2017-0062547 and 10-2017-0104075, filed May 19, 2017 and Aug. 17, 2017, respectively, the disclosures of which are hereby incorporated by reference in their entirety.

TECHNICAL FIELD

The present invention relates to a phase compensation system, and particularly, to a system for performing a phase compensation of a local oscillator (LO) for detecting the same quantum state data as that of a receiver (Bob) by a transmitter (Alice) for reverse postprocessing in a continuous variable quantum key distribution (CVQKD) protocol.

BACKGROUND ART

In a continuous variable quantum key distribution (CVQKD) protocol in the related art, reverse postprocessing is used. For example, a transmitter (Alice) transmits a quantum state generated for coded key data through a quantum channel and a receiver (Bob) notifies to the transmitter (Alice) reference information applied to detection of the quantum state and the transmitter (Alice) detects the transmitted quantum state according to the reference information from the receiver (Bob) and applies postprocessing such as error correction based on the detected data to calculate a quantum secure key data.

In general, for the reverse postprocessing according to the continuous variable quantum key distribution (CVQKD) protocol, a synchronous type is used, in which the transmitter (Alice) transmits quantum state data and quantum state phase information and the receiver (Bob) performs state detection depending on a homodyne (HOM) scheme by using a synchronized LO according to the corresponding phase information to detect the quantum state data.

However, since the quantum state data of light has a high carrier frequency of several tens to several hundreds of THz, phase synchronization of the LO is very difficult. Besides, there is a problem in that there is a risk that secrecy may be significantly reduced by a side channel attack by an eavesdropper (Eve) for the LO phase.

As a related literature, [A. Leverrier, R. Alléaume, J. Boutros, G. Zémor and P. Grangier, "Multidimensional reconciliation for a continuous-variable quantum key distribution", 2008] may be referred to.

DISCLOSURE

Technical Problem

Accordingly, the present invention is contrived to solve the problem and an object of the present invention which is used for continuous variable quantum key distribution (CVQKD) for an asynchronous local oscillator is to provide a system for performing a phase compensation of a scheme of using LO phase estimation and feedback at a receiver (Bob) using a pilot signal from a transmitter (Alice) and a scheme of measuring quantum state data using an LO having a predetermined phase at the receiver (Bob) and estimating and feeding back an LO phase through multi-dimensional reconciliation (MDR).

Technical Solution

First, when features of the present invention are summarized, a system for continuous variable quantum key distribution according to an aspect of the present invention, the system including: a receiver generating bit information through state detection for quantum state data received from a transmitter through an optical transmission path by using a first local oscillator and calculating an estimation value including information on a signal phase difference between the first local oscillator and the quantum state data; and a communication unit transmitting the estimation value to the transmitter through a public channel in order to allow the transmitter to perform the state detection of an optical signal corresponding to the quantum state data by using a second local oscillator of which the phase is compensated according to the estimation value.

Asynchronous continuous variable quantum key distribution is provided, which is capable of performing state detection of the optical signal of each quantum state data by using the first local oscillator of the receiver and the second local oscillator of the transmitter which operate independently based on the estimation value estimated by the receiver without phase synchronization of the first local oscillator of the receiver and the second local oscillator of the transmitter.

An optical detector calculating the estimation value may perform the state detection in any one scheme of a homodyne scheme or a heterodyne scheme at the receiver and the transmitter.

In the first method, the optical signal of the quantum state data may include quadrature signals having orthogonal phases to each other and pilot signals having orthogonal phases to each other before and after the quadrature signals, respectively. The optical detector performing the state detection of the received quantum state data calculates an estimation value for a signal phase difference value θ of the pilot signals relative to the first local oscillator and "θ+π/2", and the transmitter may adjust the phase basis of the second local oscillator to θ for the quadrature state projection measure onto this phase basis by calculation.

The receiver may include a frequency control circuit for frequency locking of the first local oscillator by using the estimation value from the optical detector.

The receiver may include a polarization controller for compensating polarization for the optical signal of the quantum state data received so that an amplitude at a center frequency becomes maximum by using the estimation value from the optical detector.

In the second method, the optical signal of the quantum state data may include quadrature signals having the orthogonal phases to each other, the optical detector performing the state detection for the received quantum state data may calculate the estimation value $\alpha_i$ of each dimension i for reverse multi-dimensional reconciliation, and the transmitter may perform the state detection by using the reverse multi-dimensional rotation matrix M for the reverse multi-dimensional reconciliation (MDR) based on the estimation value $\alpha_i$ and the detected states (Xs) and perform the state detection by adjusting the phase of the second local oscillator based on an known phase difference. From the corresponding detection state X, u' values are generated from the MDR decoding process with respect to all possible phase differences of the second local oscillator. Among these possible phase differences, we choose estimated phase difference θ* in a way that the probability density functions for the case where the estimated quantum state data u' is larger than 0 and the case where the estimated quantum state data u' is smaller than 0 are best separated.

In addition, according to another aspect of the present invention, a method for continuous variable quantum key distribution includes: generating, by a receiver, bit information through state detection for quantum state data received from a transmitter through an optical transmission path by using a first local oscillator and calculating an estimation value including information on a signal phase difference between the first local oscillator and the quantum state data; and receiving, by the transmitter, the estimation value through a public channel and performing the state detection of an optical signal corresponding to the quantum state data by using a second local oscillator of which the phase is compensated according to the estimation value.

Advantageous Effects

According to a system for continuous variable quantum key distribution (CVQKD) according to the present invention, since feedback is performed through LO phase estimation at a receiver (Bob) using a pilot signal from a transmitter (Alice), direct phase synchronization of an LO is not required between the transmitter (Alice) and the receiver (Bob), realization of the system is simplified, a detection error is easily compensated, frequency locking of the LO is easy, and polarization correction of received light is easy so that a signal magnitude at a center frequency of a reception quantum state becomes maximum.

In addition, for a system for continuous variable quantum key distribution (CVQKD) according to the present invention, since quantum state data using the LO having a predetermined phase is measured and an LO phase is estimated and fed back through multi-dimensional reconciliation (MDR) at the receiver (Bob), direct phase synchronization of the LO is not required between the transmitter (Alice) and the receiver (Bob). Therefore, implementation can be simplified, and also the system can not be significantly influenced by an Eve's side channel attack.

DESCRIPTION OF DRAWINGS

In order to help understand the present invention, the accompanying drawings which are included as a part of the Detailed Description provide embodiments of the present invention and describe the technical spirit of the present invention together with the Detailed Description.

BEST MODE

Hereinafter, the present invention will be described in detail with reference to the accompanying drawings. In this case, the same components in each drawing are represented by the same reference numerals as much as possible. In addition, detailed descriptions of already known functions and/or configurations are omitted. The following description focuses on parts necessary for understanding the operation according to various embodiments, and descriptions of elements that may obscure the gist of the description are omitted. In addition, some components of the drawings may be exaggerated, omitted, or schematically illustrated. The size of each component does not entirely reflect the actual size, and thus the contents described herein are not limited by the relative size or spacing of the components drawn in the respective drawings.

In describing the exemplary embodiments of the present invention, a detailed description of known art related with the present invention will be omitted when it is judged that the detailed description may unnecessarily make the gist of the present invention unclear. In addition, terms to be described below as terms which are defined in consideration of functions in the present invention may vary depending on the intention or usual practice of a user or an operator. Accordingly, the terms need to be defined based on contents throughout this specification. Terms used in a detailed description are to just describe the exemplary embodiments of the present invention and should not be restrictive in any way. Unless specifically used otherwise, expression of a singular form includes a meaning of a plural form. In the present description, an expression such as "including" or "comprising" is intended to indicate certain features, numbers, steps, operations, elements, some or combinations thereof and should not be construed to preclude the presence or possibility of one or more other features, numbers, steps, operations, elements, some or combinations thereof in addition to the described things.

Further, terms including as first, second, and the like are used for describing various constituent elements, but the constituent elements are not limited by the terms and the terms are used only for distinguishing one constituent element from other constituent elements.

Figure 1:
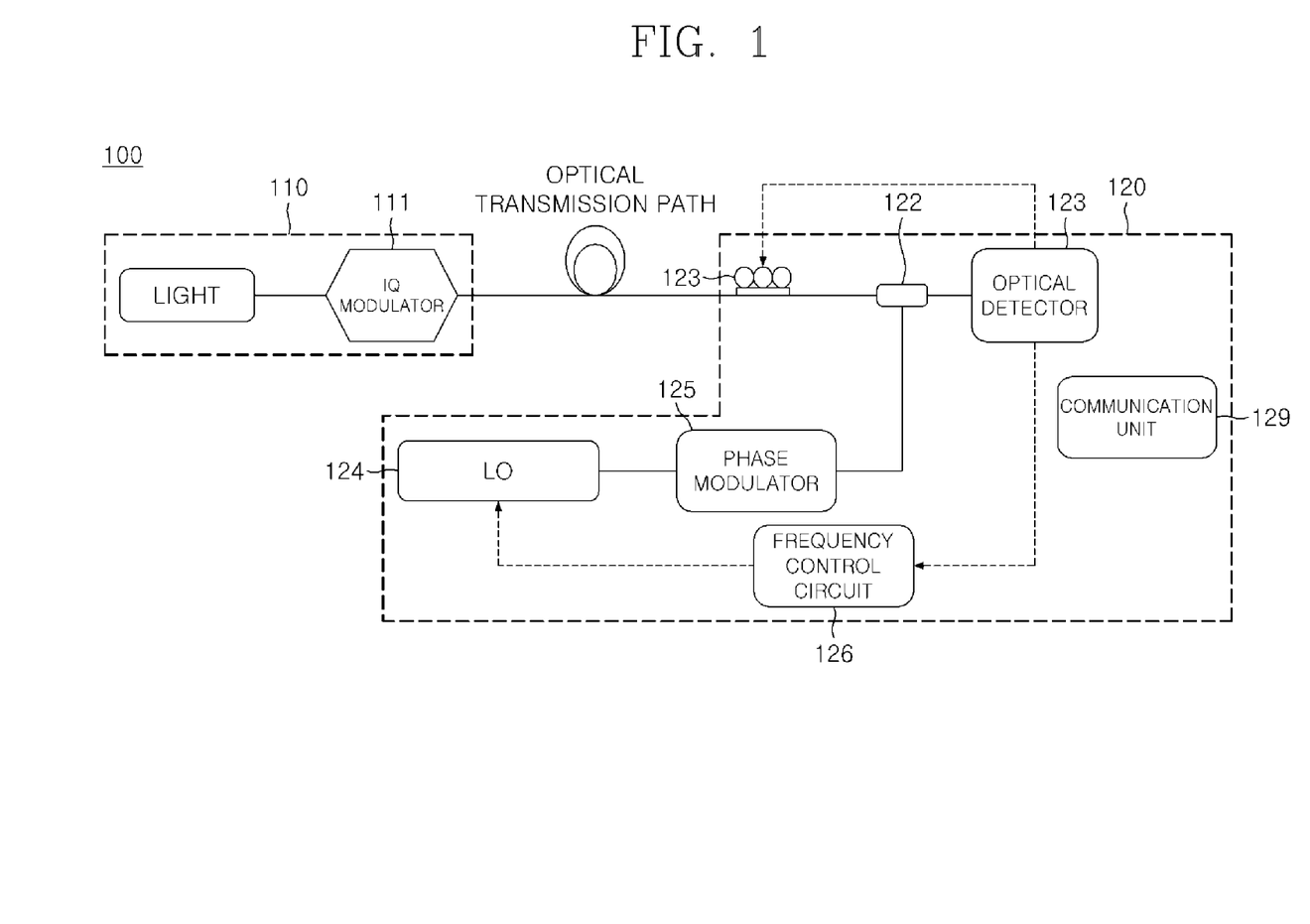
FIG. 1 is a diagram for describing a system for continuous variable quantum key distribution (CVQKD) according to an embodiment of the present invention.

FIG. 1 is a diagram for describing a system 100 for continuous variable quantum key distribution (CVQKD) according to an embodiment of the present invention.

Referring to FIG. 1, the system 100 for continuous variable quantum key distribution (CVQKD) according to an embodiment of the present invention includes a transmitter (Alice) 110 and a receiver (Bob) 120 which communicate with each other on an optical transmission path (or quantum channel).

The transmitter (Alice) 110 and the receiver (Bob) 120 may be included in various optical communication equipment on a network, i.e., a network providing a public channel, such as a wired/wireless Internet, a mobile communication network, etc. For example, Ethernet equipment, L2/L3 equipment, a server on the network, etc., may include a transmitter (Alice) 110 and a receiver (Bob) 120 for providing or receiving the quantum secure key according to the continuous-variable quantum key distribution protocol in order to transmit and receive mutually required data through optical communication.

The transmitter 110 includes an IQ modulator 111 that generates an optical signal of the quantum state such as coherent state with respect to a random data corresponding to a secure key to be transmitted by using light such as a laser and transmits the generated optical signal of the quantum state through an optical transmission path (quantum channel). The IQ modulator 111 may generate in-phase X quadrature and quadrature-phase P quadrature, i.e., optical signals (X, P quadrature) of the quantum state in which phases are orthogonal to each other by using an arbitrary waveform generator (AWG), an amplitude modulator, a phase modulator, etc.

The receiver 120 includes an optical detector 123 processing the optical signals (X and P quadrature) of the quantum state data received through the optical transmission path (or quantum channel) and generating bit information through state detection and a communication unit 129 transmitting the generated bit information to the transmitter through a public channel. Besides, the receiver 120 may further include a polarization controller 121 required for an operation of the optical detector 123, a beam splitter 122, a local oscillator 124, a phase modulator 125, a frequency control circuit 126, and the like.

Figure 2:
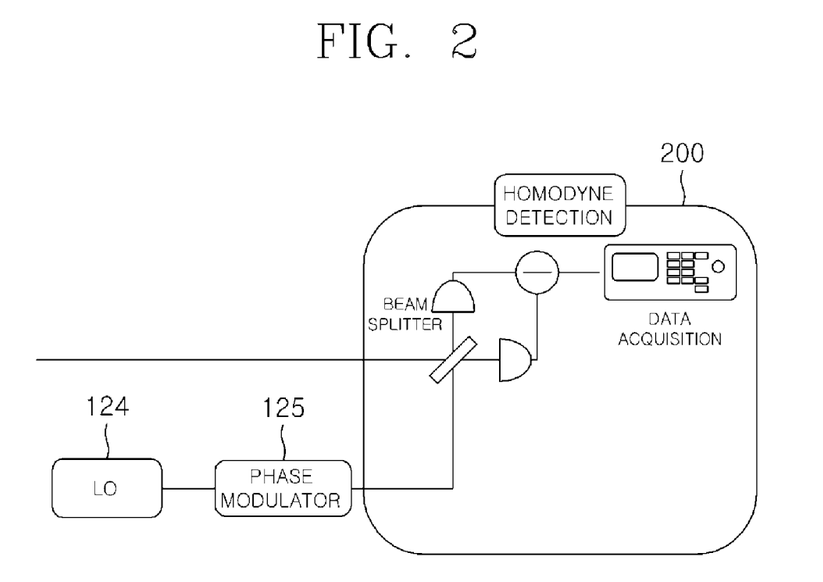
FIG. 2 is a diagram for describing a homodyne state detection scheme at a receiver according to an embodiment of the present invention.
Figure 3:
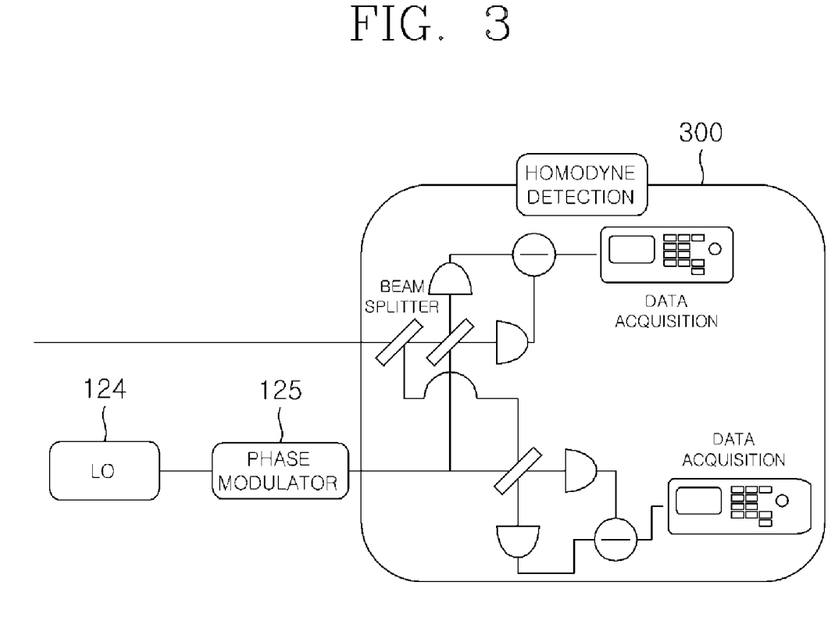
FIG. 3 is a diagram for describing a heterodyne state detection scheme at the receiver according to an embodiment of the present invention.

The optical detector 123 may perform the state detection in any one scheme of a homodyne scheme (like reference numeral 200 of FIG. 2, a state detection scheme, which detects one of the quadratures (X,P) of an optical signal of the received quantum state) or a heterodyne scheme (like reference numeral 300 of FIG. 3, a state detection scheme, which detects the both quadratures (X,P) of an optical signal of the received quantum state). For example, as illustrated in FIG. 1, when polarization of the optical signal of the received quantum state is compensated by the polarization controller 121, an oscillation signal of the local oscillator 124, such as the laser is appropriately phase-adjusted by the phase modulator 125, and then an output of the polarization controller 121 and the output of the phase modulator 125 are synthesized with each other by the beam splitter 122, the optical detector 123 performs the state detection with the homodyne or heterodyne scheme on the output of the beam splitter 122 to generate a corresponding electrical signal, i.e., the bit information (digital code).

In the present invention, as such, the receiver, 120 generates the bit information through the state detection for the quantum state received from the transmitter 110 through the optical transmission path by using a first local oscillator 124. In this case, the receiver 120 calculates an estimation value including information on the difference in signal phase between the first local oscillator 124 and the received quantum state. The receiver 120 transmits and announces to the transmitter 110 the calculated estimation value through the communication unit 129. In the transmitter 110, a predetermined optical detector (not illustrated) may perform the state detection for the optical signal corresponding to the quantum state by using a second local oscillator (not illustrated) of which the phase is compensated according to the estimation value received through the public channel. The optical detector (not illustrated) of the transmitter 110 may also generate the corresponding electrical signal, i.e., the bit information (digital code) by performing the state detection with the homodyne or heterodyne scheme on the optical signal corresponding to the quantum state. For example, the transmitted optical signal of the quantum state of the secure key is split by a beam splitter (not illustrated) of the transmitter 110 and when a first output of the corresponding beam splitter is transmitted to the receiver 120, a second output of the corresponding beam splitter may be the optical signal corresponding to the quantum state.

In this case, during the state detection of the optical detector 123, the frequency control circuit 126 may control frequency locking so that an output frequency of the first local oscillator 124 has a predetermined center frequency by using the estimation value from the optical detector 123. Further, during the state detection of the optical detector 123, the polarization controller 121 may compensate polarization of the optical signal of the quantum state so that its amplitude becomes maximum by using the estimation value from the optical detector 123.

As such, the present invention may provide asynchronous continuous variable quantum key distribution. This enables to detect quantum states by using the first local oscillator 124 of the receiver 120 and the second local oscillator (not illustrated) of the transmitter 110 which are not synchronized first and then will be synchronized based on the estimation value estimated by the receiver 120.

Hereinafter, two methods will be described in more detail, in which the receiver 120 calculates an estimation value including information on the difference in signal phase between the first local oscillator 124 and the received quantum state in order to announce the estimation value to the transmitter 110.

First Method

Figure 4:
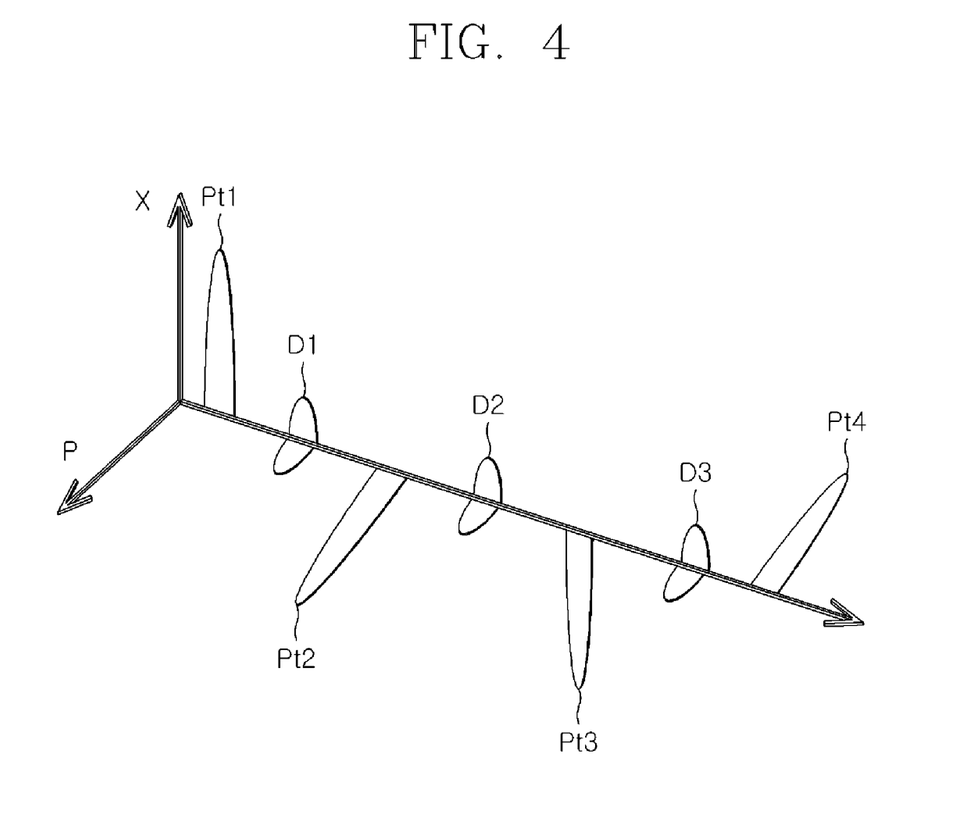
FIG. 4 is a diagram for describing an insertion concept of a pilot signal according to an embodiment of the present invention.

First, when the transmitter 110 transmits the optical signal (X, P quadrature) of the quantum state of which the phases are orthogonal to each other to the receiver 120 through the optical transmission path, the pilot signals having the orthogonal phases from each other may be inserted before and after each quadrature as illustrated in FIG. 4 in addition to the X, P quadratures (D1, D2, D3, . . . ). For example, front and rear pilot signals Pt1 and Pt2 of a first X, P quadrature D1 may have an orthogonal phase, e.g., a phase difference of 0,90 or 90,180, or 180,270, or 270,0 from each other. Here, such a phase may be a relative phase difference for the X quadrature. Similarly, even with respect to a second X, P quadrature D2, a third X, P quadrature D3, etc., front and rear pilot signals Pt1, Pt2/Pt3, Pt4 may have the phase difference of the orthogonal phase from each other.

As such, the optical detector 123 of the receiver 120 that receives the X, P quadratures D1, D2, D3, . . . , and the pilot signals having the orthogonal phases to each other before and after each quadrature may calculate a signal phase difference value θ of the pilot signals relative to an output signal of the first local oscillator 124 and "θ+π/2" as the estimation values.

Figure 5:
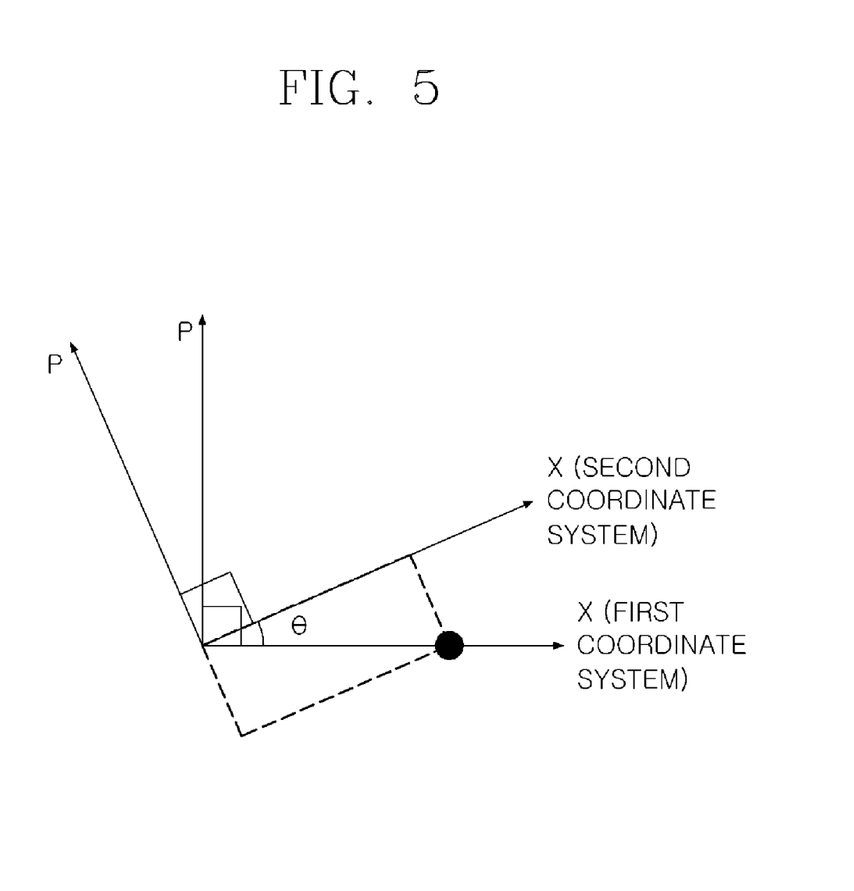
FIG. 5 is a diagram for describing a phase difference between a local oscillator and measurement data according to an embodiment of the present invention.

For example, as illustrated in FIG. 5, when values $X_R$ and $P_R$ of an X, P quadrature coordinate system (second coordinate system) for the quantum state data D1, D2, D3, . . . , measured through the state detection by the optical detector 123 of the receiver 120 are projected to each axis of an X, P quadrature coordinate system (first coordinate system) for the output signal of the first local oscillator 124, the signal phase difference value θ of the pilot signals relative to the output signal of the first local oscillator 124 may correspond to a relative phase difference between two coordinate systems. That is, the signal phase difference value θ corresponds to information on the signal phase difference between the first local oscillator 124 and the received quantum state data D1, D2, D3, . . . .

When the receiver 120 estimates the signal phase difference value θ and "θ+π/2" and transmits the estimated signal phase difference value θ and "θ+π/2" to the transmitter 110, the transmitter 110 may perform the state detection for the optical signal corresponding to the corresponding quantum state by adjusting and using the phase of the second local oscillator thereof based on the estimated values "θ" and "θ+π/2".

Figure 6:
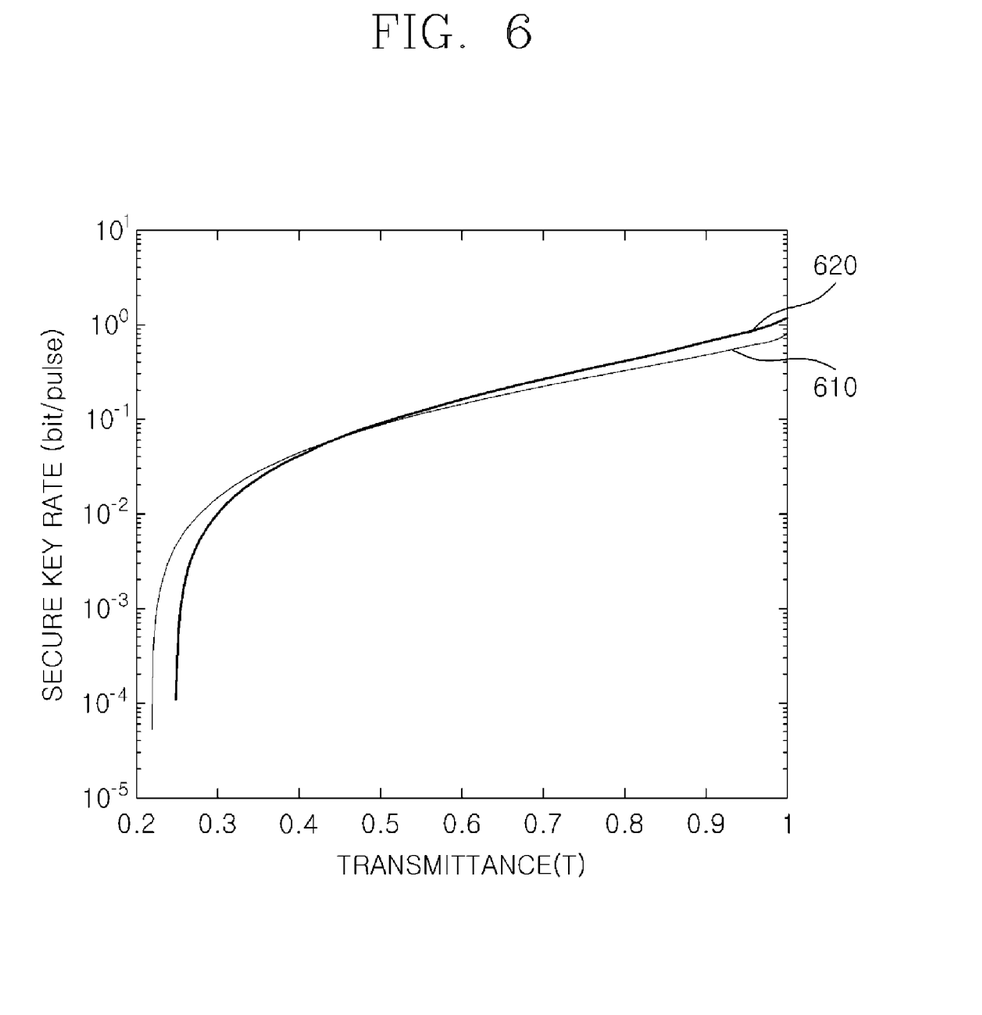
FIG. 6 is a graph for describing a secure key generation rate performance according to an application scheme of an optical detector of the present invention.

FIG. 6 is a graph for describing a secure key generation rate performance according to an application scheme of an optical detector 123 of the present invention. The graph of a secure key rate of optical transmittance of FIG. 6 shows an experimental result measured under a condition of a variance value ($V_A$) 4 (shot noise unit) which the transmitter 110 uses for modulation of a transmission signal, a variance ($V_0$) 1.8 (shot noise unit) of noise generated when the transmitter 110 modulates the transmission signal, a variance ($V_N$) 1.0 (shot noise unit) of quantum channel noise, and error correction efficiency (β) 0.95.

As illustrated in FIG. 6, it may be verified that as noise is more, for example, when the IQ modulator 111 is a low-priced modulator or uses light of a low-priced laser, performance of the secure key rate in the case of the homodyne scheme 610 is more excellent than that in the case of a heterodyne scheme 620.

Second Method

Next, the transmitter 110 transmits to the receiver 120 the optical signal (X, P quadrature) of the quantum state data of which phases are orthogonal to each other through the optical transmission path, the optical detector 123 of the receiver 120 may calculate an estimation value $α_i$ of each dimension i for reverse multi-dimensional reconciliation (MDR) and transmit the calculated estimation value to the transmitter 110. The transmitter 110 adjusts and uses the phase of the second local oscillator thereof based on the estimation value $α_i$ to perform the state detection for the optical signal corresponding to the quantum state.

The reverse multi-dimensional reconciliation (MDR) is known as a very strong scheme which may extend a security distance exceeding a 3 DB loss allowance value by using a GG02 CVQKD protocol (see thesis, A. Leverrier, R. Alléaume, J. Boutros, G. Zémor and P. Grangier, "Multidimensional reconciliation for a continuous-variable quantum key distribution", 2008). For example, in an example of 8-dimension, when the phase of the output of the local oscillator 124 is $θ_B$, the receiver 120 may generate raw quantum state (key) u randomly and calculate the multi-dimensional rotation matrix M satisfying [Equation 1], with respect to a quantum state measurement value y by the state detection of the homodyne scheme using the phase.

$$Mŷ=u$$

$$u=[u_0, \ldots u_7]^T, u_k=±1 \quad \text{[Equation 1]}$$

Here, y=x+n, and x represents a quantum state transmitted by the transmitter 110, n represents noise by shot noise included in the quantum state received by the receiver 120, represents a normalized vector of y, and the multi-dimensional rotation matrix M and a reference rotation matrix $R_k$ of [Equation 2] are shared by the transmitter 110 and the receiver 120.

$$M=Σ_{k=0}^7 α_k R_k$$

$$R_k∈\{I⊗I⊗I, X⊗iY⊗Z, iY⊗I⊗I, Z⊗iY⊗I,$$
$$X⊗I⊗iY, Z⊗X⊗iY, X⊗iY⊗X, Z⊗Z⊗iY\} \quad \text{[Equation 2]}$$

That is, here, X, Y, and Z represent spin matrices of Pauli and the receiver 120 estimates a real value of each dimension i of the multi-dimensional rotation matrix M to calculate the estimation value $α_i$ of each dimension i and transmit the calculated estimation value to the transmitter 110 and share the transmitted estimation value with the transmitter 110.

As a result, the transmitter 110 may calculate u' corresponding to a compensated value with respect to measurement x as shown in [Equation 3] by using the estimation value $α_i$.

$$u'=Mx̃ \quad \text{[Equation 3]}$$

Here, x represents values measured by performing the state detection of a corresponding 8 qubit quantum state in the homodyne scheme by the transmitter 110 by using the estimation value $α_i$ of the receiver 120 and x̃ represents a normalized vector of x. When the noise is small, u'≈u.

As such, the transmitter 110 performs homodyne detection by using the reverse multi-dimensional rotation matrix M for the reverse multi-dimensional reconciliation (MDR) based on the estimation value $α_i$ and the detected states (Xs) and searches the corresponding detection state in which probability density functions for a case where the estimated quantum state data u' is larger than 0 and the estimated quantum state data u' is smaller than 0 are best separated each other, i.e., x=⟨θ'|ψ$^{(8)}$⟩ to acquire a phase difference value θ* corresponding thereto. When the phase difference value θ* is acquired, the transmitter 110 adjusts the phase of the second local oscillator thereof based on the acquired phase difference value to smoothly perform the state detection for the quantum state data. The substantially estimated phase difference value θ* may be estimated so that a mean square error becomes minimum based on u' of ±1.

Figure 7:
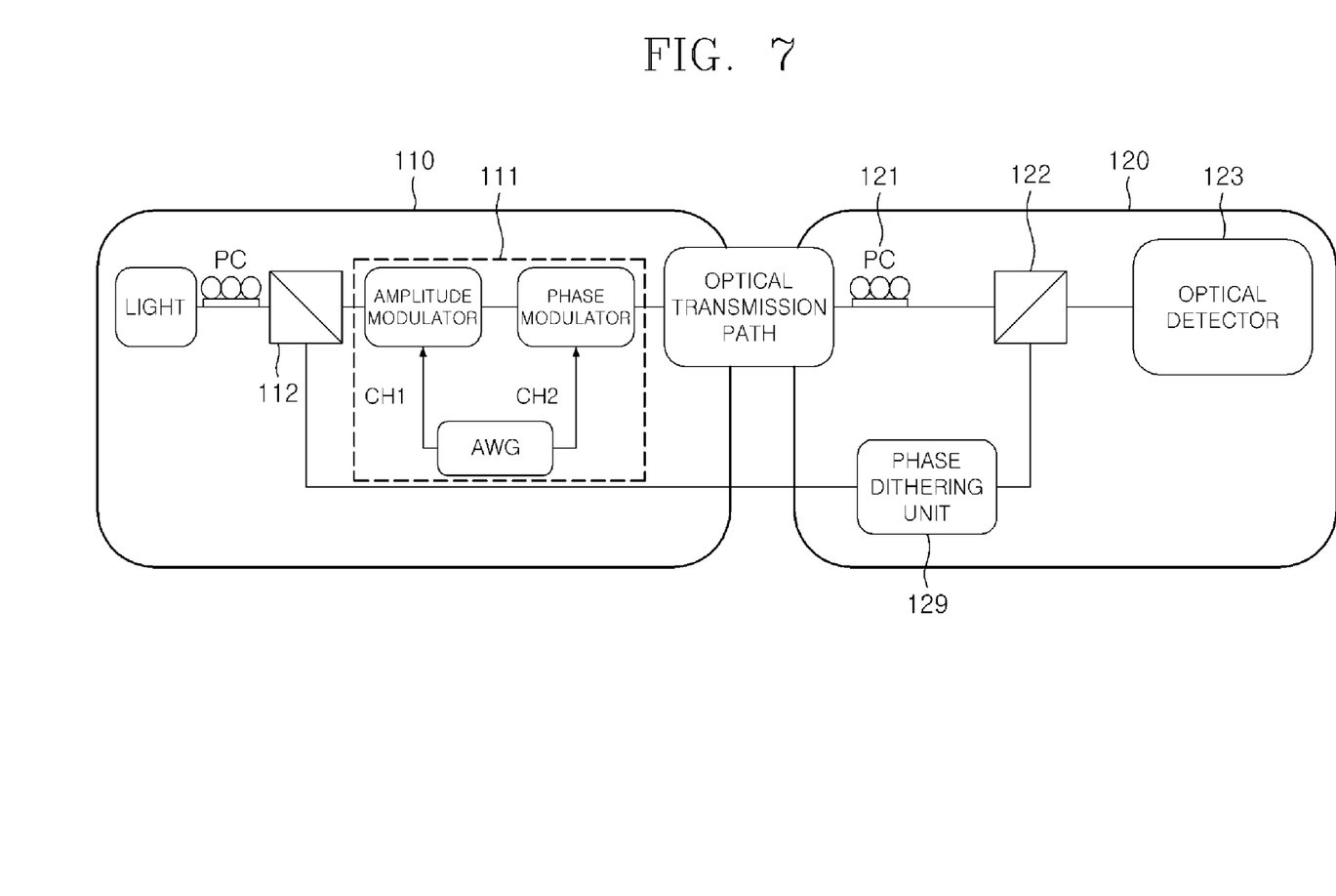
FIG. 7 is a diagram for describing an experiment scheme of a system for continuous variable quantum key distribution (CVQKD) according to an embodiment of the present invention.

FIG. 7 is a diagram for describing an experiment scheme of a system 100 for continuous variable quantum key distribution (CVQKD) according to an embodiment of the present invention.

For example, the optical signal of target quantum state passing through a polarization controller (PC) in the transmitter 110 is split by the transmitter 110. As a first output, the optical signal (X, P quadrature) of the quantum state in which i X and P quadratures are orthogonal to each other is generated by the IQ modulator 111 including a predetermined waveform generator AWG, an amplitude modulator, a phase modulator, and the like and transmitted through the optical transmission path. In respect to a second output of the beam splitter 112, the corresponding output becomes noisy or an optical signal having a different phase due to slight dithering by a phase dithering unit 129 and input into the beam splitter 122 of the receiver 120 to be synthesized with the output of the polarization controller 121 of the receiver 120.

Figure 8:
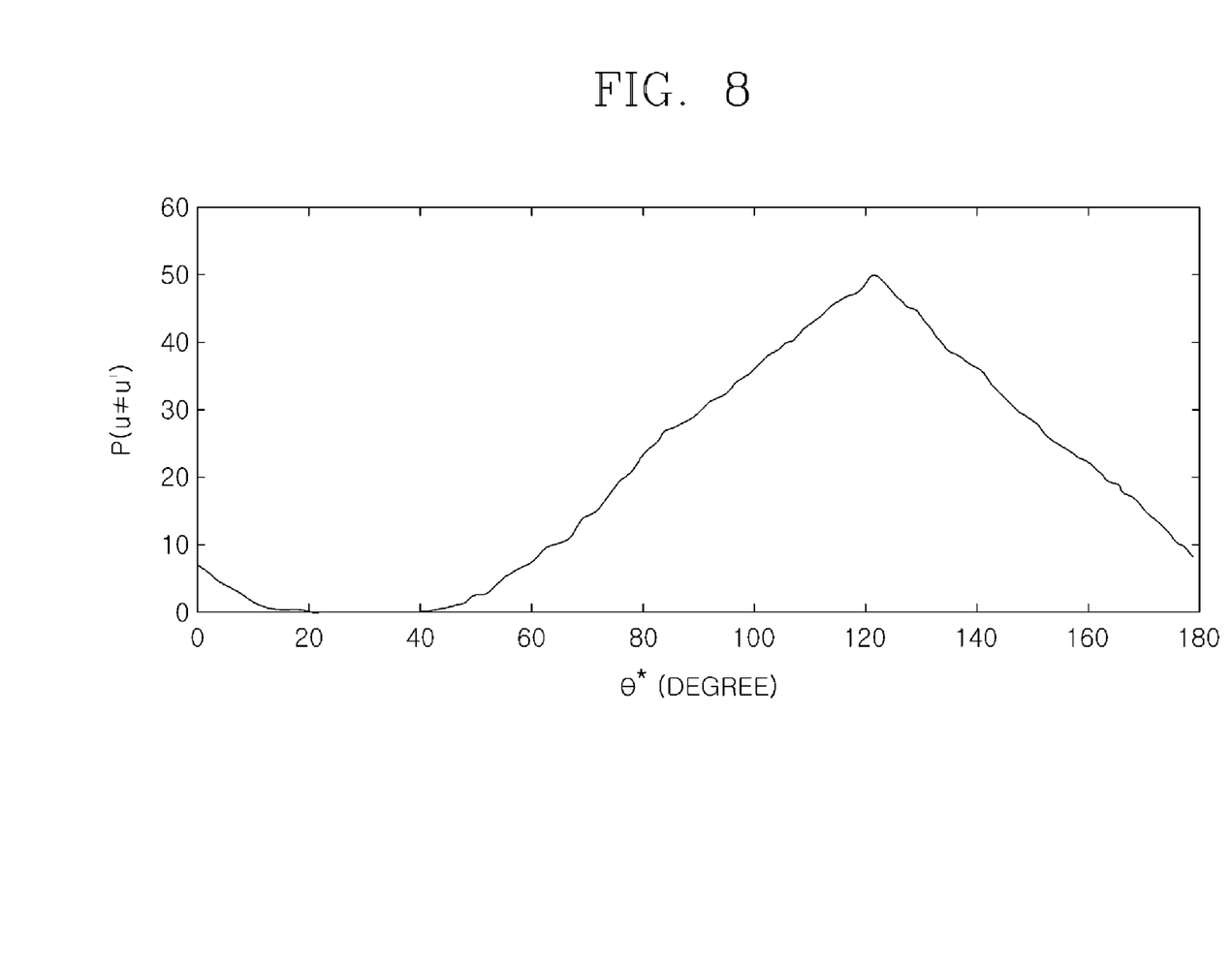
FIG. 8 is a graph showing a relationship of a phase θ at a transmitter and a probability P(u'≠u) which is an estimation state u'≠u in an experiment of FIG. 7.

FIG. 8 is a graph showing a relationship of a phase θ* at a transmitter 110 and a probability P(u'≠u) which is an estimation state u'≠u in an experiment of FIG. 7.

As illustrated in FIG. 8, in the case where the estimated phase difference value θ* is small, the probability P(u'≠u) has a very small value and even in the case where the estimated phase difference value θ* is large, the mean square error may become minimum based on u' of ±1.

Figure 9:
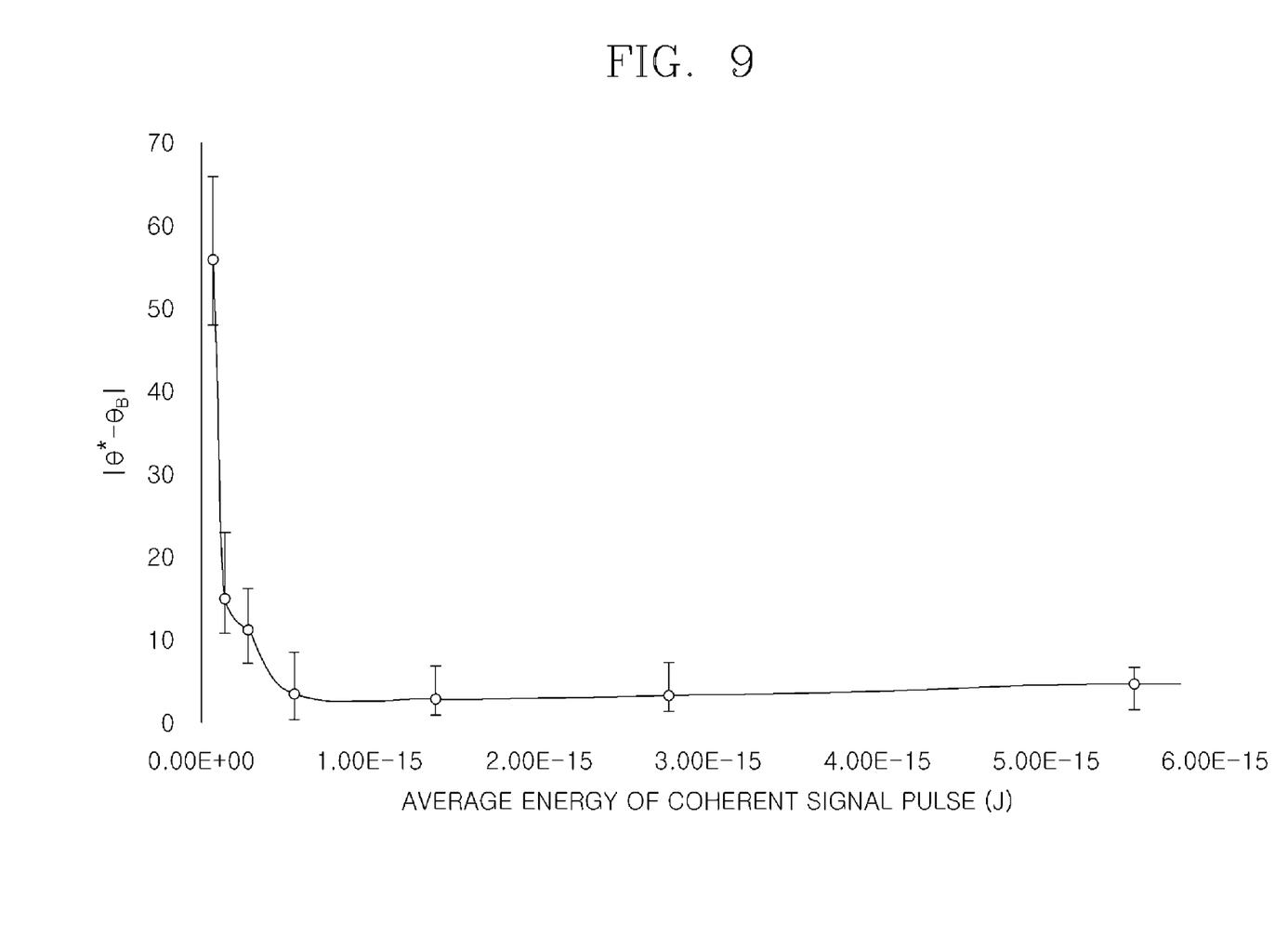
FIG. 9 is a graph showing a relationship between a difference between an estimation phase θ* at the transmitter and a local oscillator phase $\theta_B$ at the receiver and average energy of a coherent state signal in the experiment of FIG. 7.

FIG. 9 is a graph showing a relationship of a difference between an estimation phase θ* at the transmitter 110 and a local oscillator phase $\theta_B$ at a receiver 120 and average energy of a coherent state signal.

In the experiment of FIG. 7, when the receiver 120 receives maximum signal power and local oscillator (LO) power, mean photon numbers in the case of the optical signal and the LO are $4.3 \times 10^4$ photons/pulse and $2.2 \times 10^7$ photons/pulse, respectively at −35.6 dBm. When the signal power is changed from −35.6 to −51.6 dBm, the difference between the estimated phase θ* at the transmitter 110 and the local oscillator phase $\theta_B$ at the receiver 120 shows 3 to 5° in a signal power range which exceeds −45.6 dBm as illustrated in FIG. 9 and this indicates that the proposed system 100 is effective in finding the phase of the LO by the receiver 120.

As described above, for a system 100 for continuous variable quantum key distribution (CVQKD) according to the present invention, since feedback is performed through LO phase estimation at a receiver (Bob) using a pilot signal from a transmitter (Alice), direct phase synchronization of an LO is not required between the transmitter (Alice) and the receiver (Bob), which simplifies realization of the system. Furthermore, the present invention also provide easy compensation of detection error and polarization error and easy frequency locking of the LO, so that a signal magnitude at a center frequency of a reception quantum state becomes maximum. In addition, the present invention provides the alternative method to synchronization of the LO with multi-dimensional reconciliation (MDR). Since quantum state using the LO having a predetermined phase is measured and an LO phase is estimated and fed back through multi-dimensional reconciliation (MDR) at the receiver (Bob), direct phase synchronization of the LO is not required between the transmitter (Alice) and the receiver (Bob), which simplifies implementation. Furthermore, the system is not significantly influenced by a side channel attack by an eavesdropper (Eve).

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from a scope without departing from an essential characteristic of the present invention. Accordingly, the spirit of the present invention should not be defined only by the described embodiments, and it should be appreciated that claims to be described below and all technical spirit which is equivalent to the claims or equivalently modified is included in the claim of the present invention.

The invention claimed is:

1. A system for continuous variable quantum key distribution, the system comprising:
a receiver generating bit information through state detection for quantum state data received from a transmitter through an optical transmission path by using a first local oscillator and calculating an estimation value including information on a signal phase difference between the first local oscillator and the quantum state data; and
a communication unit transmitting the estimation value to the transmitter through a public channel in order to allow the transmitter to perform the state detection of an optical signal corresponding to the quantum state data by using a second local oscillator of which the phase is compensated according to the estimation value;
wherein the optical signal of the quantum state data includes quadrature signals having orthogonal phases to each other and pilot signals having orthogonal phases to each other before and after the quadrature signals, respectively, and,
wherein the receiver performing the state detection of the received quantum state data calculates an estimation value for a signal phase difference value θ of the pilot signals relative to the first local oscillator and "θ+π/2", and the transmitter adjusts the phase of the second local oscillator based on the estimation values "θ" and "θ+π/2".

2. The system of claim 1, wherein asynchronous continuous variable quantum key distribution is provided, which is capable of performing state detection of the optical signal of each quantum state data by using the first local oscillator of the receiver and the second local oscillator of the transmitter which operate independently based on the estimation value estimated by the receiver without phase synchronization of the first local oscillator of the receiver and the second local oscillator of the transmitter.

3. The system of claim 1, wherein an optical detector calculating the estimation value performs the state detection in any one scheme of a homodyne scheme or a heterodyne scheme at the receiver and the transmitter.

4. The system of claim 1, wherein the receiver includes a frequency control circuit for frequency locking of the first local oscillator by using the estimation value from the optical detector.

5. The system of claim 1, wherein the receiver includes a polarization controller for compensating polarization for the optical signal of the quantum state data received so that an amplitude at a center frequency becomes maximum by using the estimation value from the optical detector.

6. A system for continuous variable quantum key distribution, the system comprising:
a receiver generating bit information through state detection for quantum state data received from a transmitter through an optical transmission path by using a first local oscillator and calculating an estimation value including information on a signal phase difference between the first local oscillator and the quantum state data; and,
a communication unit transmitting the estimation value to the transmitter through a public channel in order to allow the transmitter to perform a state detection of an optical signal corresponding to the quantum state data by using a second local oscillator of which the phase is compensated according to the estimation value,
wherein the optical signal of the quantum state data includes quadrature signals having orthogonal phases to each other
the optical detector performing the state detection of the received quantum state data calculates the estimation value $\alpha_i$ of each dimension I for reverse multi-dimensional reconciliation and
the transmitter performs the state detection by using a reverse multi-dimensional rotation matrix M for the reverse multi-dimensional reconciliation based on the estimation value $\alpha_i$ and the detected states (xs), and performs the state detection by adjusting the phase of the second local oscillator based on a phase difference value θ* corresponding to the corresponding detection state x in which probability density functions for a case where the estimated quantum state data u' is larger than 0 and a case where the estimated quantum state data u' is smaller than 0 are best separated.

7. A method for continuous variable quantum key distribution, the method comprising:

generating, by a receiver, bit information through state detection for quantum state data received from a transmitter through an optical transmission path by using a first local oscillator and calculating an estimation value including information on a signal phase difference between the first local oscillator and the quantum state data; and receiving, by the transmitter, the estimation value through a public channel and performing the state detection of an optical signal corresponding to the quantum state data by using a second local oscillator of which the phase is compensated according to the estimation value, wherein the optical signal of the quantum state data includes quadrature signals having the orthogonal phases to each other, and pilot signals having orthogonal phases to each other before and after the quadrature signals, respectively, and wherein the receiver performing the state detection for the received quantum state data calculates an estimation value for a signal phase difference value θ of the pilot signals relative to the first local oscillator and "θ+π/2", and the transmitter adjusts the phase of the second local oscillator based on the estimation values "θ" and "θ+π/2.

8. A method for continuous variable quantum key distribution, the method comprising:

generating, by a receiver, bit information through state detection for quantum state data received from a transmitter through an optical transmission path by using a first local oscillator and calculating an estimation value including information on a signal phase difference between the first local oscillator and the quantum state data; and receiving, by the transmitter, the estimation value through a public channel and performing the state detection of an optical signal corresponding to the quantum state data by using a second local oscillator of which the phase is compensated according to the estimation value, wherein the optical signal of the quantum state data includes quadrature signals having orthogonal phases to each other, an optical detector performing the state detection of the received quantum state data calculates the estimation value $\alpha_i$ of each dimension i for reverse multi-dimensional reconciliation, and the transmitter performs the state detection by using a reverse multi-dimensional rotation matrix M for the reverse multi-dimensional reconciliation based on the estimation value $\alpha_i$ and the detected states (xs), and performs the state detection by adjusting the phase of the second local oscillator based on a phase difference value θ corresponding to the corresponding detection state x in which probability density functions for a case where the estimated quantum state data u' is larger than 0 and a case where the estimated quantum state data u' is smaller than 0 are best separated.

* * * * *